(12) United States Patent
Mesnier et al.

(10) Patent No.: US 9,842,156 B2
(45) Date of Patent: Dec. 12, 2017

(54) SYSTEM AND METHOD FOR PROVIDING DIFFERENTIATED STORAGE SERVICE IN A DATABASE

(75) Inventors: Michael P. Mesnier, Scappoose, OR (US); Tian Luo, Columbus, OH (US); Feng Chen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 473 days.

(21) Appl. No.: 13/993,357

(22) PCT Filed: Dec. 29, 2011

(86) PCT No.: PCT/US2011/067788
§ 371 (c)(1),
(2), (4) Date: Jun. 12, 2013

(87) PCT Pub. No.: WO2013/101037
PCT Pub. Date: Jul. 4, 2013

(65) Prior Publication Data
US 2014/0122489 A1  May 1, 2014

(51) Int. Cl.
*G06F 17/30* (2006.01)
*H04L 29/08* (2006.01)

(52) U.S. Cl.
CPC .. *G06F 17/30598* (2013.01); *G06F 17/30312* (2013.01); *H04L 67/1097* (2013.01); *H04L 67/322* (2013.01)

(58) Field of Classification Search
CPC .... G06F 12/00; G06F 13/14; G06F 17/30312; G06F 17/40; G06F 3/067; G06F 11/34; G06F 3/0625; G06F 3/0634; G06F 3/0653; G06F 3/0659; G06F 3/0689; G06F 17/30082; G06F 17/30197
See application file for complete search history.

(56) References Cited

U.S. PATENT DOCUMENTS

| | | | |
|---|---|---|---|
| 7,558,850 B2 | 7/2009 | Chambliss | |
| 7,636,801 B1 | 12/2009 | Kekre | |
| 7,814,204 B1* | 10/2010 | Wang et al. | 709/226 |
| 8,086,711 B2 | 12/2011 | Chambliss | |
| 2004/0003087 A1* | 1/2004 | Chambliss et al. | 709/226 |
| 2007/0177522 A1* | 8/2007 | Okitsu et al. | 370/252 |
| 2008/0046269 A1* | 2/2008 | Lopez | 705/1 |
| 2008/0222311 A1* | 9/2008 | Lee et al. | 710/6 |
| 2009/0144632 A1 | 6/2009 | Mendez | |
| 2010/0077107 A1* | 3/2010 | Lee | G06F 3/0611 710/6 |

(Continued)

OTHER PUBLICATIONS

PCT International Search Report and Written Opinion issued in corresponding PCT/US2011/067788 dated May 29, 2012 (8 pages).

(Continued)

*Primary Examiner* — Dinku Gebresenbet
(74) *Attorney, Agent, or Firm* — Patent Capital Group

(57) ABSTRACT

In accordance with some embodiments, classification of input/output requests from a database to a storage system may be performed. Each input/output request may be associated with a database class, and each database class may be mapped to a quality of service policy. Thus, quality of service may be enforced such that different data blocks within the storage system of the database may be afforded appropriate quality of service.

30 Claims, 2 Drawing Sheets

(56) References Cited

U.S. PATENT DOCUMENTS

2011/0066668 A1\* 3/2011 Guarraci ................. 707/831
2012/0311138 A1\* 12/2012 Inamdar ............. G06F 11/3404
  709/224

OTHER PUBLICATIONS

Non Final Office Action in U.S. Appl. No. 15/198,881 dated Nov. 4, 2016.

\* cited by examiner

| CLASSIFIER | QoS POLICY |
|---|---|
| LOG | FAST WRITES |
| SMALL TABLE | LOW LATENCY |
| INDEX | LOW LATENCY |
| LARGE TABLE | HIGH BANDWIDTH |
| ... | ... |

SYSTEM AND METHOD FOR PROVIDING DIFFERENTIATED STORAGE SERVICE IN A DATABASE

BACKGROUND

This relates generally to computer databases and storage systems.

Storage systems may be implemented using a block interface that abstracts databases from the internal details of the storage system. Storage systems can be composed of disk drives, disk arrays, Redundant Array of Independent Disks (RAID) arrays, and other storage devices. The internal details of the storage system may refer to the presence and size of caches, different types of RAID levels, the number of disks, and more. Example block interfaces may include, but are not limited to, the Small Computer System interface (SCSI) and Advanced Technology Attachment (ATA) block command sets. To this end, block interfaces may be designed for ease-of-use and interoperability between different database systems and storage systems.

However, due to the level of abstraction provided by the storage block interface, certain information may be lost while communicating an input/output (I/O) operation regarding the source of the I/O and its contents. For example, it may not be feasible for the storage system to determine whether the I/O operation relates to a database record, table, index, journal, or any other database structure. In other words, storage systems may be unable to differentiate between different types of I/O operations.

Thus, quality of service policies of storage systems within a database system are usually implemented at a volume-wide level. Certain inefficiencies can arise under this framework since a quality of service policy for a particular volume may only benefit a fraction of storage requests (i.e., I/O operations) to that volume. As a result, valuable resources may be unnecessarily expended while executing the quality of service policy.

BRIEF DESCRIPTION OF THE DRAWINGS

Some embodiments are described with respect to the following figures.

DETAILED DESCRIPTION

In accordance with some embodiments, identification of database I/O requests facilitates the classification of those I/O requests and/or operations. Classification of those requests in turn enables each classification to be matched to at least one quality of service policy. Thus, quality of service policies may be enforced so that different database I/O requests can be afforded appropriate quality of service.

In some embodiments read/write operations may be implemented using the Portable Operating System Interface for Unix (POSIX) read/write commands. To this end, a database classifier may be associated with each command. In other words, each command may include a pointer that points to a particular database class depending on the particular nature of the request. For example, depending on the I/O request to the storage system, the pointer may point to different database classes such as a database index, a database log, a database table, a database record, or any other database data structure.

In one embodiment, an unsigned integer may be associated with the scatter/gather lists passed to the POSIX writev( ) and ready( ) functions. Each unsigned integer may correspond to a different database class as described above. However, one of ordinary skill in the art would understand that other classification schemes are also possible. The particular classification method may be implemented according to particular database design, and as such, may be designed with specific vendors in mind.

Thus, I/O requests issued to a storage system in a database system may be classified according to one or more database classes. Furthermore, one or more quality of service policies may be associated with each database class. In one embodiment, a table mapping database classes to quality of service policies may be stored in a memory of the storage system. For example, a database index class may be considered as requiring a low latency response while a database journal class may be identified as requiring redundancy. Such mappings may be stored in the above mentioned table.

Furthermore, a storage controller within the storage system may enforce or execute the I/O request according to the appropriate quality of service policy. For instance, quality of service policies that relate to low latency or high priority I/O requests from the database may specify the I/O request to be stored in a cache memory. Thus, these I/O requests may be serviced more quickly. As another example, quality of service policies that relate to high reliability or redundancy for certain storage blocks may specify that these blocks be replicated in the storage system.

Classifying I/O requests in this manner may enable storage system optimization to be performed on a block level. Thus, quality of service policies may be executed on individual blocks rather than on an entire volume, thereby increasing efficiency of the storage system.

Figures 1, 2:
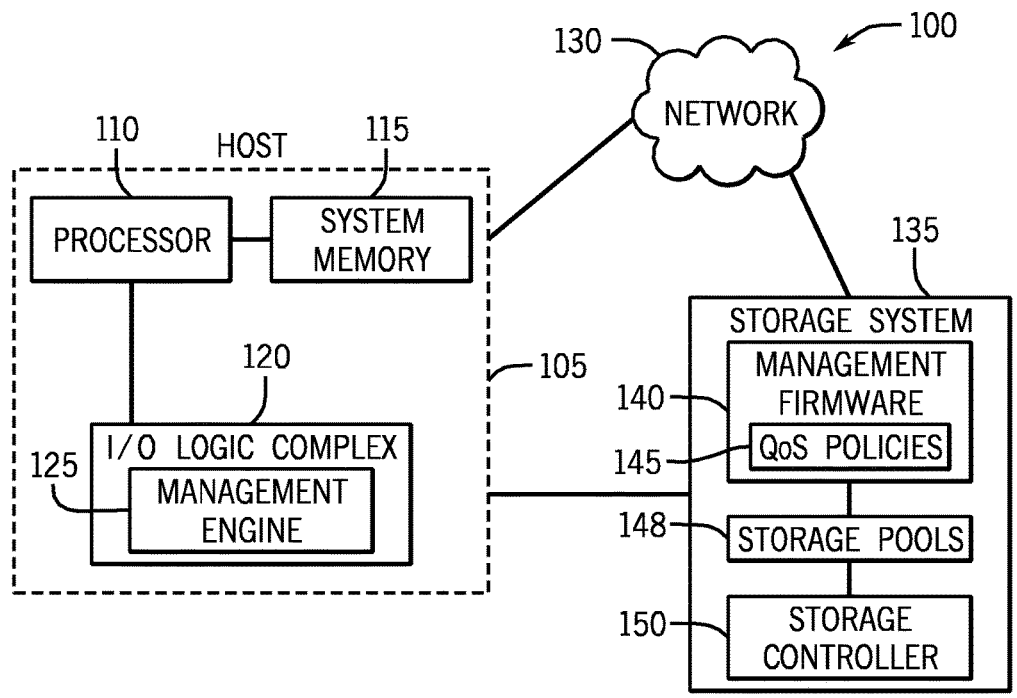
FIG. 1 is a system depiction for one embodiment of the present invention.
FIG. 2 is a table depiction for one embodiment of the present invention.

Referring now to FIG. 1, a host database 105 of the database system 100 may be shown. The host 105 may be any processor based system including a desktop, server, laptop computer, or mobile device. In one embodiment, the host 105 may be a database that generates database I/O requests to a storage system 135. Additionally, the host 105 may include a processor 110 coupled to system memory 115 and an I/O logic complex 120.

The I/O logic complex 120 may generate I/O requests to the storage system 135 according to instructions from the host 105. As such, the host 105 may be coupled to the storage system 135 via a network layer 130 or otherwise through a direct connection. The network 130 may be any network including, but not limited to, a Local Area Network (LAN), Wide Area Network (WAN), SCSI, ATA, and the Internet.

In generating the I/O requests, the I/O logic complex 120 may include a management engine 125 to perform classification of those requests. For instance, management engine 125 may associate every I/O request with a database class. Thus, in one embodiment, the management engine 125 may include logic to associate a classifier to each I/O request to indicate that the request belongs to a particular database class or classes. In another embodiment, one or both of the management engine 125 and the I/O logic complex 120 may be implemented within an operating system of the host database 105.

The storage system 135 may be supported by any number and combination of storage devices. For instance, the storage system 135 may include combinations of solid state drives, hard disk drives, magnetic tape drives, flash memory, non-volatile memory, random access memory, nontransitory computer-readable mediums, and/or any other storage mediums. Furthermore, the storage system 135 may be capable of representing combinations of the above mentioned storage devices as storage pools 148 or logical volumes. For example, a group of solid state drives may be represented as one logical volume while a group of hard disk drives may be represented as another logical volume.

As such, different storage quality of services may be associated with different storage pools 148. In some embodiments, a storage pool 148 of solid state drives may represent a highest level of service since solid state drives may be the quickest to respond and service storage requests. In addition, a storage pool 148 of hard disk drives may indicate a medium level of service while a storage pool 148 of magnetic tape drives may be associated with a low level of service.

Furthermore, the storage system 135 may include management firmware 140 to store database quality of service policies 145. As such, quality of service policies 145 may be associated with each database class and may affect how database I/O requests may be executed. To this end, a storage controller 150 may also be included within the storage system 135 to execute I/O requests according to their associated quality of service policies.

In one embodiment, for database I/O requests classified under a database class designated as high priority, low latency responses may be desirable. Thus, a quality of service policy for low latency responses may specify that the I/O request is to be stored in a cache memory in the storage system 135. In another embodiment, I/O requests for a database class desiring high reliability may be generated. As such, a corresponding quality of service policy may specify that certain blocks within the logical volumes of the storage system 135 should be replicated. For example, the quality of service policy may apply RAID level to be maintained on certain blocks. Thus, quality of service may be provided for a storage system 135 of the database system 100 on a class-by-class basis.

Moreover, one of ordinary skill in the art would understand that the above mentioned policies are not to be construed as a comprehensive list. Other policies are also contemplated within the present disclosure. For instance, a security policy could be associated with database I/O requests to provide a desirable level of encryption on certain data blocks within the storage system 135.

In one embodiment, a table mapping database classes to quality of service policies may be generated and stored in the storage system 135 before initialization of the database system 100. An illustrative example of such a table is provided with reference to FIG. 2. The quality of service table 200 maintains a column for the database class or classifier 210 and another column 220 for the associated quality of service policies. For instance, a database log class may be associated with a fast write policy, a database small table class may be associated with a low latency policy, and a database large table class may be associated with a high bandwidth policy.

Thus, the management engine 125 or any other logic within the host 105 may generate the quality of service table 200. Then, before initialization of the database system 100, the host 105 may transfer the quality of service table 200 to be stored in the management firmware 140 of the storage system 135. This transfer may be performed out-of-band. The quality of service table may then be accessed during real-time operation of the database system 100.

Generally, in order for a host database 105 to access data in any storage system 135, an operating system in the host 105 may use a file system to provide information about the particular data blocks necessary to access a file. Once a file system has provided this block information related to a particular file, the request to access the actual storage medium may be made through a driver (e.g., management engine 125) in an I/O layer (e.g., I/O logic complex 120) of the host operating system. The I/O layer may include code to process the access request to one or more blocks. In some embodiments, the driver may implement an I/O protocol, such as the SCSI protocol, the Internet SCSI protocol, the serial advanced technology attachment protocol (SATA) or any other I/O protocol. The driver may process a block request and send the I/O storage request to a storage controller 150 which then proceeds to access the storage system 135.

In many database system implementations, the Portable Operating System Interface for Unix (POSIX) standard may be used to interface with the storage system. As such, POSIX may provide for vectored I/O requests in the form of the functions writev( ) and readv( ). In other words, these functions may enable data to be written and/or read with respect to multiple data buffers using a single I/O operation. Thus, data from non-contiguous blocks in a storage medium of the storage system may be written or read in a single operation, thereby increasing efficiency of the storage system.

Typically, a list of pointers, sometimes referred to as scatter/gather lists, may be passed to the writev( )and readv( ) functions. Each of the pointers in the lists may point to a data buffer. These lists may then be passed as part of the I/O requests to the storage system, thereby avoiding separate write/read commands for each block. Additionally, the writev( ) and readv( )functions may be performed directly against a device or may instead be performed on a file in the file system.

Therefore, in some embodiments, classification of the database I/O requests may be performed with respect to the Portable Operating System Interface for Unix (POSIX) standard. Specifically, an operating system of the database host 105 may include a flag for I/O requests to indicate that such requests have associated classification. In one embodiment, the flag may be referred to as the O_CLASSIFIED flag. Furthermore, logic in the host database 105 may append or otherwise associate an additional data element with the scatter/gather lists (e.g., the list of data buffers) typically passed to the writev( ) and ready( ) POSIX functions.

To this end, the additional element passed with the scatter/gather lists may include a pointer to another buffer containing the database classifier. The database classifier may be any data element. In one embodiment, the database classifier may be an unsigned integer that maps to a specific database class (e.g., a database index, a database log, a database table, etc.). For example, a table mapping unsigned integer values with database classes may be stored in the system memory 115 of the host 105. One of ordinary skill art would understand that the specific classification scheme is not limited to the above embodiment. Instead, the classification framework may be dependent on the particular database and may be designed according to the desires of any user or vendor of the database system 100.

Thus, operating systems with knowledge of the classification scheme may generate I/O requests having the O_CLASSIFIED flag set for the POSIX writev( ) and ready( ) functions. The O_CLASSIFIED flag may provide an indication to the management engine 125 to then extract the database classifier from the scatter/gather lists and attach it to an outgoing storage request (e.g., an outgoing SCSI command). Applications without knowledge of the classification scheme may not have an O_CLASSIFIER flag or its equivalent set, and therefore, may ignore the additional database classifier.

Once the classified I/O request reaches the storage system 135, management firmware 140 may extract the database classifier. Then, the management firmware 140 may access the quality of service policies 145 stored within. As previously discussed, these policies 145 may be stored as part of a quality of service table 200 mapping database classes to one or more quality of service policies 145. Thus, the management firmware 140 may extract the database classifier from the storage request and perform a lookup to the quality of service table 200 to determine the appropriate quality of service policy 145. The storage controller 150 may then execute the database I/O requests to the storage pools 148 according to the appropriate quality of service policies 145.

Figure 3:
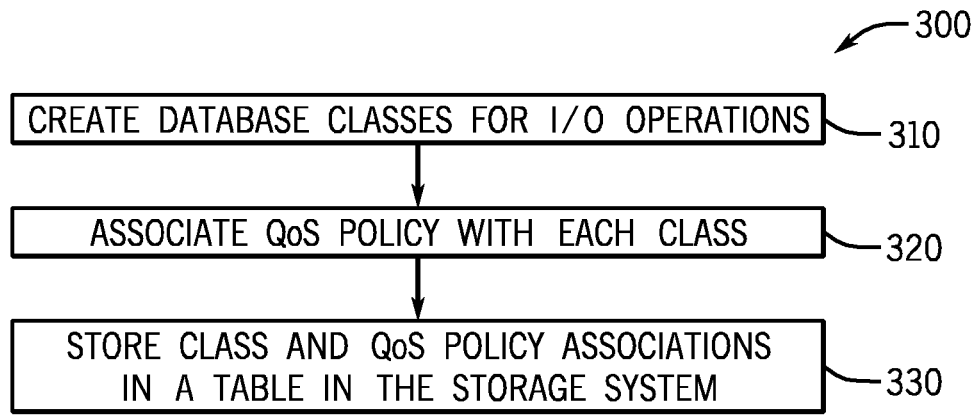
FIG. 3 is a flowchart for one embodiment of the present invention.

Turning now to FIG. 3, a flow diagram is shown depicting a method for storing database class and quality of service policy associations. The method may be implemented in hardware, software, and/or firmware. In software or firmware embodiments, it may be implemented by computer executed instructions stored in a non-transitory computer readable medium such as an optical, magnetic, or semiconductor storage.

The method may begin in step 310, where database classes are created. In some embodiments, each I/O operation of the host 105 may be associated with one or more of these database classes.

Then, in step 320, one or more quality of service policies may be associated with each database class. Example quality of service policies may include fast write policies for database logs and low latency policies for database small tables and database records. In step 330, the associations between the database classes and the quality of service policies may be stored as a table in the storage system. As previously mentioned, this table may be transferred out-of-band to the storage system before initialization of the database system 100.

Figure 4:
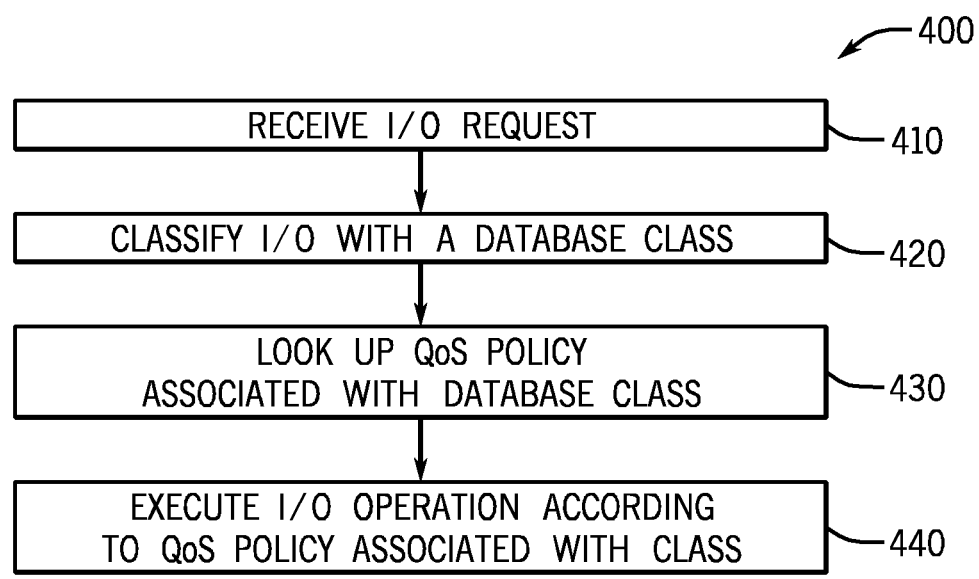
FIG. 4 is a flowchart for another embodiment of the present invention.

FIG. 4 provides for a flow diagram illustrating a method 400 for classifying database I/O requests in real-time during operation of the database system. database class and quality of service policy associations. The method may be implemented in hardware, software, and/or firmware. In software or firmware embodiments, it may be implemented by computer executed instructions stored in a non-transitory computer readable medium such as an optical, magnetic, or semiconductor storage.

The method 400 may begin in step 410 where a database I/O request from the host database 105 is received. Then, in step 420, the I/O request may be classified under one or more database classes. In some embodiments, classification may be performed by the I/O logic complex 120, the management engine 125, and/or any other logic within the host 105. In other embodiments, logic in the storage system may be configured to perform classification of the I/O requests.

In one embodiment, the classification may be performed using the POSIX interface. For example, the database host 105 may generate the I/O request having a class identifier as part of the writev( )and ready( )functions. The management engine 125 may extract the class identifier and append it to the outgoing I/O request to the storage system 135.

In step 430, a lookup to a table 200 storing database class and quality of service policy associations is performed. Thus, the appropriate quality of service policy may be determined for the I/O request according to its particular database class. In step 440, the database I/O request may be executed according to the appropriately determined quality of service policy.

Therefore, database I/O operations in a database system 100 may be individually classified. As a result, quality of service may be performed in the storage system on a class-by-class basis. Thus, efficiency in the storage system may be increased since valuable resources are not wasted on enforcing volume-wide quality of service policies on data blocks that do not benefit from such policies.

It should be noted that the present disclosure is not intended to be limited by the particular combinations of elements and their related functions described above. As such, other combinations are also contemplated. For example, in one embodiment, classification of the database I/O requests and enforcement of their associated quality of service policies may be performed entirely within the storage system 135. In another embodiment, these functions may be performed entirely within the host database 105. Furthermore, I/O logic complex 120 and the management engine 125 may be located in the storage system. Conversely, the storage controller 150 and/or management firmware 140 may be located in the host database computer 105.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method, comprising:
   receiving, in a storage system, an input/output request directed from a database to a storage system;
   determining from the input/out request that the database corresponds to a particular one of a plurality of database classes;
   classifying, in the storage system, the input/output request under at least the particular database class, wherein a database classifier is included with the input/output request to identify the particular database class;
   associating, in the storage system and prior to receipt of the input/output request, a particular quality of service policy with the particular database class; and
   executing the input/output request in the storage system according to the particular quality of service policy.

2. The method of claim 1, wherein each database class in the set of database classes is associated with at least one quality of service policy.

3. The method of claim 2, wherein associations between each database class and the respective quality of service policies are stored in a table in the storage system before initialization of the database.

4. The method of claim 3, wherein classifying the input/output request comprises appending the database classifier to the input/output request.

5. The method of claim 4 further comprising:
extracting the database classifier from the input/output request; and
performing a lookup in the table using the database classifier to determine an appropriate quality of service policy.

6. The method of claim 1, wherein the particular policy comprises a performance-related policy.

7. The method of claim 6, wherein executing the input/output operation according to the particular policy comprises storing the input/output operation in a cache memory according to the particular policy.

8. The method of claim 1, wherein the particular policy comprises a reliability-related policy.

9. The method of claim 8, wherein executing input/output operation according to the particular policy comprises replicating certain data blocks in the storage system.

10. The method of claim 1, wherein the particular policy comprises a security-related policy for encrypting certain data blocks in the storage system.

11. A database system, comprising:
a memory; and
a processor to execute instructions stored in the memory to cause the processor to:
receive, in the memory, an input/output request directed from a database to a storage system;
determine from the input/out request that the database corresponds to a particular one of a plurality of database classes;
classify, in the memory, the input/output request under at least the particular database class, wherein a database classifier is included with the input/output request to identify the particular database class;
associate, in the memory and prior to receipt of the input/output request, a particular quality of service policy with the particular database class; and
execute the input/output request in the storage system according to the particular quality of service policy.

12. The system of claim 11, wherein each database class in the set of database classes is associated with at least one quality of service policy.

13. The system of claim 12, wherein associations between each database class and respective quality of service policies are stored in a table in the storage system before initialization of the database.

14. The system of claim 13, wherein classifying the input/output request comprises appending the database classifier to the input/output request.

15. The system of claim 14, wherein the instructions, when executed, further cause the processor to:
extracting the database classifier from the input/output request; and
performing a lookup in the table using the database classifier to determine an appropriate quality of service policy.

16. The system of claim 11, wherein the particular policy comprises a performance-related policy.

17. The system of claim 16, wherein executing the input/output operation according to the particular policy comprises storing the input/output operation in a cache memory.

18. The system of claim 11, wherein the particular policy comprises a reliability-related policy.

19. The system of claim 18, wherein executing input/output operation according to the particular policy comprises replicating certain data blocks in the storage system.

20. The system of claim 11, wherein the set of database classes comprises a database index class, a database log class, a database table class, and a database record class.

21. A non-transitory computer-readable medium to store instructions executable by a processor, the instructions comprising:
receiving, in a storage system, an input/output request directed from a database to the storage system;
determining from the input/out request that the database corresponds to a particular one of a plurality of database classes;
classifying, in the storage system, the input/output request under at least the particular database class, wherein a database classifier is included with the input/output request to identify the particular database class;
associating, in the storage system and prior to receipt of the input/output request, a particular quality of service policy with the particular database class; and
executing the input/output request in the storage system according to the particular quality of service policy.

22. The medium of claim 21, wherein each database class in the set of database classes is associated with at least one quality of service policy.

23. The medium of claim 22, wherein associations between each database class and respective quality of service policies are stored in a table in the storage system before initialization of the database.

24. The medium of claim 23, wherein classifying the input/output request comprises appending the database classifier to the input/output request.

25. The medium of claim 24, the instructions further comprising:
extracting the database classifier from the input/output request; and
performing a lookup in the table using the database classifier to determine an appropriate quality of service policy.

26. The medium of claim 21, wherein the particular policy comprises a performance-related policy.

27. The medium of claim 26, wherein executing the input/output operation according to the particular policy comprises storing the input/output operation in a cache memory.

28. The medium of claim 21, wherein the particular policy comprises a reliability-related policy.

29. The medium of claim 28, wherein executing input/output operation according to the particular policy comprises replicating certain data blocks in the storage system.

30. The medium of claim 21, wherein the plurality of database classes comprise a database index class, a database log class, a database table class, and a database record class.

* * * * *